(12) United States Patent
Van Hoof (10) Patent No.: US 6,309,496 B1
(45) Date of Patent: *Oct. 30, 2001

(54) METHOD AND APPARATUS FOR MAKING DUAL LAYER DVD DISCS

(75) Inventor: Peter Van Hoof, Moosic, PA (US)

(73) Assignee: WEA Manfacturing Inc., Olyphant, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/314,336

(22) Filed: May 19, 1999

Related U.S. Application Data (60) Provisional application No. 60/122,790, filed on Mar. 4, 1999.

(51) Int. Cl.[7] ............ B44C 1/20; B05D 5/06; C23C 14/22; G11B 7/26; G11B 5/84
(52) U.S. Cl. ............ 156/230; 156/232; 156/233; 156/240; 156/241; 156/247; 427/146; 427/164; 428/64.7; 204/192.27; 369/275.1; 369/283
(58) Field of Search ............ 156/230, 232, 156/233, 240, 241, 247, 277, 289; 427/146, 147, 148, 162, 164; 204/192.27; 369/275.1, 283; 428/64.4, 64.7

(56) References Cited

U.S. PATENT DOCUMENTS 4,877,475 * 10/1989 Uchida et al. ............ 156/273.7
6,117,284 * 9/2000 Mueller ............ 204/192.27

FOREIGN PATENT DOCUMENTS

706178A2 * 4/1996 (EP) ............ G11B/7/26
09007978A * 1/1997 (JP) ............ H01L/21/304

* cited by examiner

Primary Examiner—Richard Crispino
Assistant Examiner—J. A. Lorengo
(74) Attorney, Agent, or Firm—Gottlieb, Rackman & Reisman, P.C.

(57) ABSTRACT

An improved method and apparatus for making a dual-layer DVD disc that does not require a stamping step (typically, as part of the 2P prior art manufacturing process) during its manufacture. As proposed by Mueller, a polycarbonate substrate is molded and coated with a semireflective data layer in the usual way. A PMMA substrate is molded and coated with a fully reflective data layer. Adhesive is placed on the semireflective data layer, and the fully reflective data layer is transferred from its PMMA substrate to the polycarbonate substrate. The polycarbonate substrate thus ends up with two data layers in conformance with the DVD specifications, and the PMMA substrate can even be recycled for another use. However, instead of using a PMMA substrate that is larger than the polycarbonate substrate as proposed by Mueller, in the invention they have equal diameters. This allows conventional molding equipment to be used with no major changes. Also, while the substrates are sandwiched together, the equal diameters allow an edge milling operation to remove any adhesive that is trasfered to the PMMA substrate.

8 Claims, 7 Drawing Sheets

FIG. 1 Prior Art
(Single Layer, Single Side: DVD-5)

FIG. 2 Prior Art (Dual Layer, Single Side: DVD-9)

FIG. 4 Prior Art (Dual Layer, Dual Side: DVD-18)

FIG. 3 Prior Art
(Dual Layer, Single Side: DVD-9)

METHOD AND APPARATUS FOR MAKING DUAL LAYER DVD DISCS

This application claims the benefit of U.S. provisional application No. 60/122,790, filed Mar. 4, 1999, now expired.

BACKGROUND OF THE INVENTION

This invention relates to optical discs, and more particularly to an improved method and apparatus for making double-sided, 3-layer and 4-layer optical discs, such as DVD-14 and DVD-18 discs.

Very high capacity optical discs have two information layers that can be read with the same laser beam. The read head focuses the beam on a selected one of the two information layers. Each information layer is a reflective coating that modulates and reflects the laser beam. The information layer closest to the side of the disc where the read head is positioned has a semireflective coating. When the laser beam is focused on this layer, sufficient light is reflected to allow the data on this layer to be read. The information layer that is remote from the side of the disc where the read head is positioned has a fully reflective coating. When the laser beam is focused on this layer, light that passes through the semireflective layer is modulated by the fully reflective layer and passes once again through the semireflective layer.

Single-layer DVD discs are made using the same type of equipment that has been used for many years in the manufacture of CDs. A substrate is injection molded to have an information layer in the form of pits and lands. The information layer is then sputtered with a fully reflective aluminum coating, and a protective coating may be applied on top of the sputtered surface. Because a DVD disc made this way has only half the thickness of a CD yet the finished DVD must be as thick as a CD, two DVD discs are bonded together to make a finished DVD. If the DVD is to have only a single information layer, then the second disc may be a blank. If the DVD is to have two information layers, two single-layer discs may be bonded together. (If reading is to take place from only one side, one of the reflective layers must be semireflective; if reading is to take place from both sides, then both reflective layers should be fully reflective.) But as long as no more than two information layers are required for a DVD, standard CD production techniques can be used to make each disc.

The problem is that standard CD production techniques are not adequate or manufacturing dual-layer optical discs that have three or more reflective coatings. The substrate and one semireflective coating can be made in the usual way—injection molding followed by sputtering (using gold to obtain a semireflective coating rather than aluminum as in the case of a CD where a fully reflective coating is needed). But the injection molding equipment used in CD production facilities can not be used to mold the additional pit-and-land structure required for a second information layer. Therefore, what has been proposed in the prior art is to coat the semireflective coating with a viscous resin and to stamp the second information layer in it (followed by conventional sputtering and application of a conformal coating). However, the companies presently in the CD production business do not generally have stamping equipment that is adequate for this purpose, and therefore new assembly lines have been proposed for producing dual-layer DVD discs.

Before proceeding, it is necessary to define certain terms as they are used herein. Because a CD has a single substrate structure that is 1.2-mm thick and a DVD has two 0.6-mm thick substrate structures bonded together, the word "disc" herein has different meanings depending on the context. It can refer to the 0.6-mm substrate structure that makes up half of a DVD, or it can refer to the entire 1.2-mm thick DVD itself. Also, the word substrate refers to an injection-molded plastic disc, while the term substrate structure refers to the same disc together with whatever coatings (sputtered, etc.) may be on it.

It is also important to understand what is meant herein by the terms stamping and stamper. Injection molding is a technique in which liquid plastic is injected into an enclosed volume (a mold). Stamping is a technique in which a press is caused to move against a solid sheet or a viscous layer of material to impress a pattern in it, the operation usually not taking place in an enclosed space. In the days of vinyl records, which records were made by stamping machines, the pattern in the press that was impressed into a flattened vinyl "biscuit" was naturally called a stamper. Since injection molds also require a pattern to impress into the injected plastic, and the pattern for a CD is made in a way reminiscent of the way vinyl record stampers were made, it was natural for the CD industry to call the pattern placed in a mold a "stamper" even though it is not used in a stamping machine. Thus as used herein the operation called stamping involves a press which moves, usually in open space, to embosses a pattern into a viscous material, and the word stamper refers to such a pattern whether it is used in stamping equipment or injection molding equipment.

The copending application of William R. Mueller, entitled "Dual-Layer DVD Disc, and Method and Apparatus for making Same," filed on even day herewith and hereby incorporated by reference, discloses a method (and associated manufacturing apparatus and finished product) for making dual-layer 0.6-mm DVD discs using injection molding equipment that does not also require the use of stamping equipment. This allows dual-layer 0.6-mm DVD discs to be made using primarily the equipment presently found on the assembly lines of CD and DVD manufacturers. The Mueller method entails making two substrates, each with a metallic information layer, in the usual way—with injection molding equipment. The first substrate has a semireflective (gold) information layer. The second substrate has a fully reflective (aluminum) information layer. The semireflective information layer on the first substrate is coated with a very thin layer of glue, and the fully reflective information layer on the second substrate is then transferred to the layer of glue. In this way, a 0.6-mm dual-layer disc is formed without requiring additional stamping equipment, and with both metallic layers having been sputtered onto molded substrates.

Because it is desired that the fully reflective metallic layer release from the second substrate during the transfer step, the second substrate—which does not end up as part of the finished DVD—can be made of polymethyl methacrylate (PMMA) rather than the polycarbonate of the first substrate. The fact that PMMA does not bond well to aluminum, and adhesion is only through molecular roughness, is advantageous.

The usual protective coating may then be applied as the last step in the making of the dual-layer 0.6-mm substrate structure. Another single-layer or dual-layer substrate structure may then be bonded to the dual-layer structure made in accordance with the Mueller invention to make a DVD-14 or DVD-18 disc.

A problem with the Mueller method is that the substrate for the fully reflective layer has a diameter larger than that of the substrate that actually forms part of the finished DVD.

A force is applied to the outer periphery of the larger substrate in order to push it away from the substrate structure to which the fully reflective layer has been transferred. Although the larger substrate can still be made on conventional CD-type molding equipment, the larger size does require some changes to be made in the molding equipment, as well as the handling mechanisms associated with the sputtering machine, etc.

Another problem with the Mueller method is that after the fully reflective layer is separated from the larger substrate, it is seen that some of the adhesive originally on the semireflective layer on the smaller substrate (the one that will become part of the finished DVD) has been squeezed out onto the edge of the deposited fully reflective layer. It is difficult to remove this adhesive without contaminating the substrate, and this causes problems in subsequent bonding.

It is an object of my invention to provide a method and apparatus for making dual-layer discs based on the Mueller method while at the same time solving the aforesaid problems.

SUMMARY OF THE INVENTION

In the illustrative embodiment of my invention, both substrates have the same diameter, equal to that of a finished DVD. Before separating the substrate structures from each other, the edge of the substrate "sandwich" is cleaned by a milling machine, thus eliminating any adhesive that migrated to the edge of the substrate sandwich and avoiding contamination. Milling is possible because the two substrates are of equal diameter. The milling does no damage to the information surface being transferred because it is not exposed, and it has been found that the milling actually facilitates removal of the semireflective layer from its original substrate.

It has been found that this method provides an additional benefit. The vibration from the milling facilitates release of the fully reflective layer from its substrate by partially releasing the edge. This makes it easier to separate the substrate originally carrying the fully reflective layer from such layer. While there is no peripheral surface to push against in order to move the substrate away from the previously adhering fully reflective layer, separation is facilitated by suction cups on the flat surfaces of the two substrates.

BRIEF DESCRIPTION OF THE DRAWINGS

It being understood that none of the drawings is to scale (as some of the dimensions are in microns, as is well understood in the art), and it further being understood that FIGS. 1–6 are identical to FIGS. 1–6 in the Mueller application.

DETAILED DESCRIPTION OF THE PREFERRED EMBODIMENTS

The manufacture of a DVD optical disc is very similar to that of a CD optical disc. Although more care must be taken to properly replicate the tinier pits in thinner substrates, and two substrates must be bonded together, most of the production process is the same as that for a CD. In fact, as will become apparent, it is precisely because it is desired that the same type of equipment be useable in the manufacture of both products that the need for the Mueller invention arose in the first place.

Figure 1:
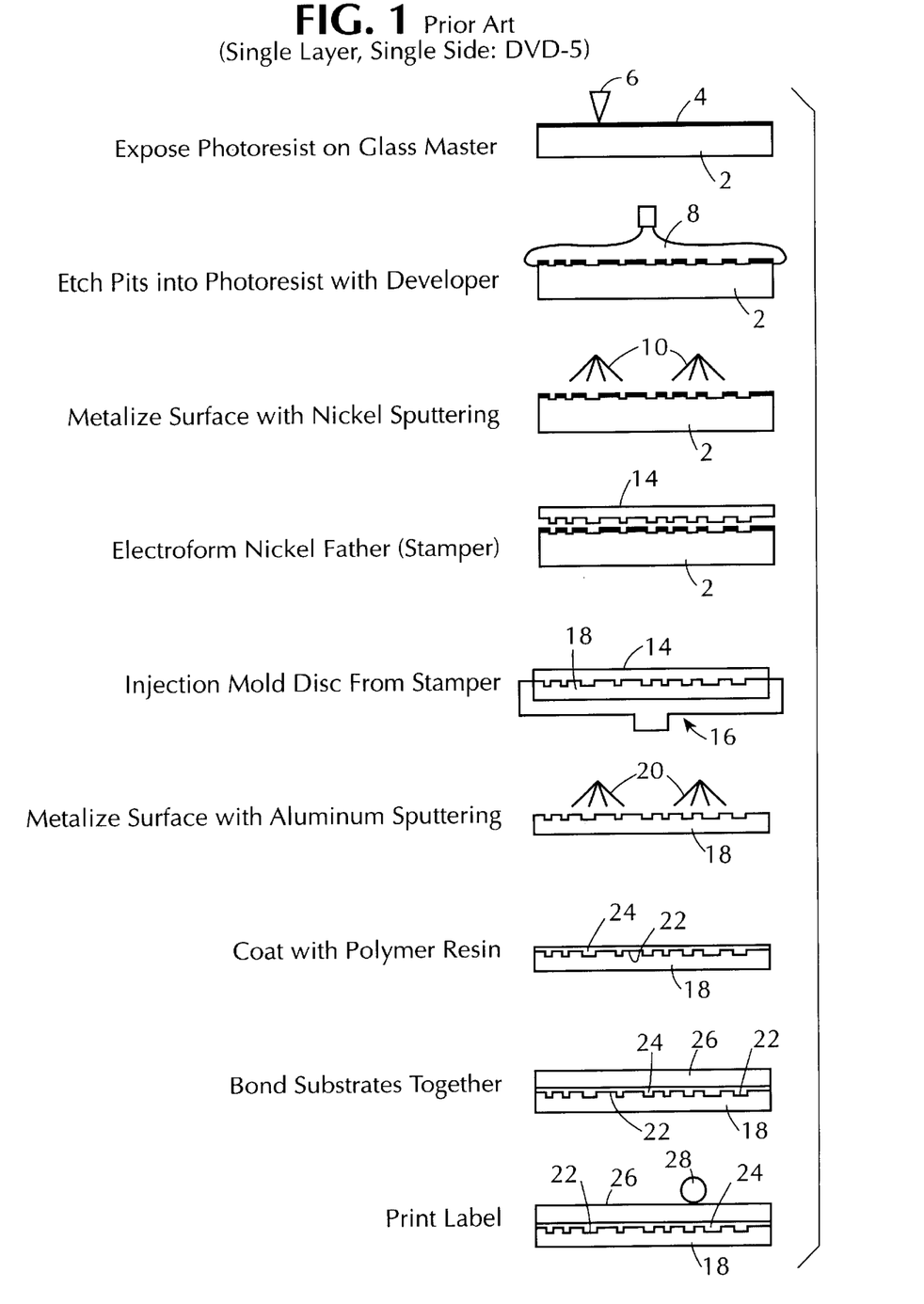
FIG. 1 depicts the standard steps in making a prior art Single-Layer, Single-Side DVD-5 disc.

The standard (prior art) DVD manufacturing process, which is basically the CD manufacturing process, is shown schematically in FIG. 1. What is depicted here are the steps in making the simplest type of DVD disc, one that is read from only a single side ("Single Side") and that has only a single information layer ("Single Layer") that can be read from that side. The disc is referred to as DVD-5 because the bit capacity is between 4 and 5 gigabytes. Manufacture begins with "mastering"—creation of metal "stampers" that will ultimately be used in replication. The first step in this process, shown in FIG. 1, is to use a laser beam 6 from a laser beam recorder machine to expose a photoresist 4 that is deposited on a glass master 2. The photoresist is then etched with developer solution 8 in order to form pits in the photoresist.

In the third step, the etched photoresist (with the required pit-and-land pattern) is metalized with nickel sputtering, shown by the numeral 10. The glass substrate with its metalized surface is then used in an electrochemical plating process ("electroforming") to create a "father" or "stamper" 14. (In many applications, the father is used to create "mother" discs, which can then be used to create multiple stampers.) The stamper, usually made of nickel, contains a mirror image of the pits that are to be created on the final discs. In the molding process, liquid plastic 18 (usually polycarbonate) is injected into a mold 16 in which the stamper is held. The raised bumps on the stamper are pressed into the liquid plastic during the injection molding process to create pits. The molded disc 18 is then metalized with aluminum sputtering, shown by the numeral 20, and the resulting aluminum layer 22 represents the information contained on the disc.

A molded CD has a thickness of 1.2 mm, and a DVD is to have the same thickness. But the molded DVD substrate has a thickness of only 0.6 mm. For this reason, the substrate structure is coated with a polymer resin 24, and a blank 0.6-mm thick disc 26 is bonded to it. In the last step, a roller 28 or some other mechanism prints the DVD label on the disc 26.

It is important to appreciate that while the element 14 is called a "stamper," it is used in an injection molding process. Injection molding is at the heart of disc manufacture, and injection molding involves use of a closed cavity into which liquid plastic is injected, the cavity imparting its form to the plastic after it cools and hardens.

Figure 2:
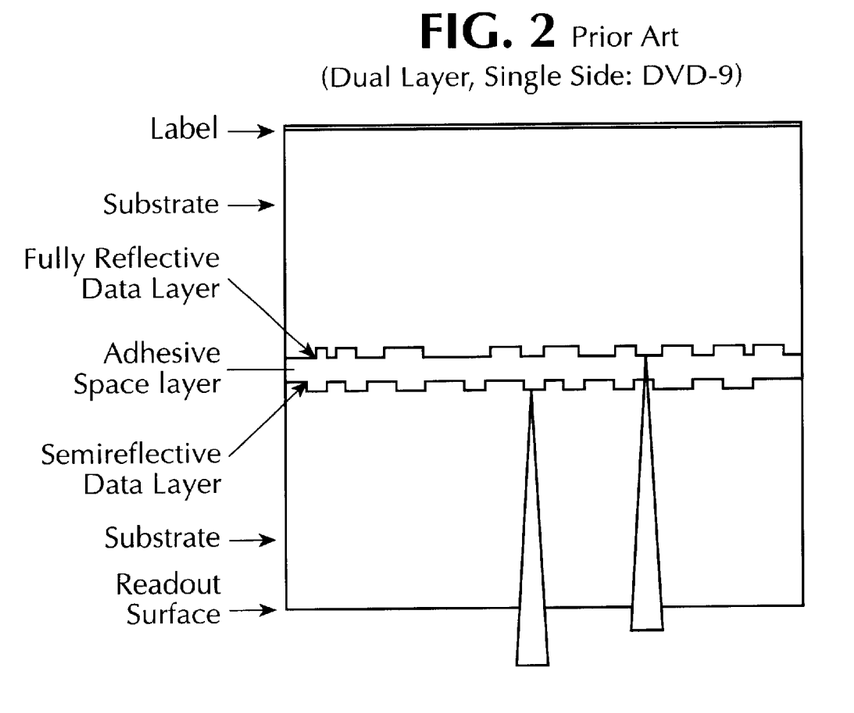
FIG. 2 depicts a prior art Dual-Layer, Single-Side DVD-9 disc which is basically two 0.6-mm discs bonded together, each made in accordance with the steps depicted in FIG. 1.

The DVD of FIG. 2 is referred to as a Dual Layer, Single Side disc because it has two information layers that can be read from one side (the side at the bottom with the stylized triangular-shaped laser beam). Every DVD is composed of two bonded plastic substrates. Each substrate with data can contain one or two layers of data. The first layer, called layer 0, is closest to the side of the disc from which the data is read. The second layer, called layer 1, is farthest from the readout surface. A disc is read from the bottom, so layer 0 is below layer 1. The layers are spaced very close together—the distance between layers is less than one-tenth of the thickness of the substrate (less than one-twentieth of the thickness of the overall DVD).

In the case of a single layer, the information surface is covered with a thin reflective layer of aluminum by a sputtering process. This creates a metallic coating between 35 and 55 nanometers thick. For two layers, the laser must be able to reflect from the first layer when reading it, but also focus through it when reading the second layer. Therefore, the first layer is only semireflective, while the second layer is fully reflective (a relative term since even the fully reflective layer is only about 70% reflective).

The various layers of the disc of FIG. 2 are self-explanatory, but there are two points that should be understood. The first is that while the capacity of the single layer disc of FIG. 1 is 4.7 gigabytes, the capacity of the disc of FIG. 2, even though it has two information layers, is only 8.5 gigabytes, less than twice the capacity of the single-layer disc. The reason for this is that the readout beam must pass through the outer layer to get to the inner layer, a distance of about 20 to 70 microns, and this gives rise to inter-layer crosstalk. To reduce the crosstalk, the minimum pit length of both layers is increased from 0.4 um to 0.44 um and there are slightly fewer tracks per inch, thus reducing the overall capacity somewhat.

The second point, far more important for an understanding of the Mueller method, is that the prior art DVD of FIG. 2 has each of its information layers in a different 0.6-mm thick disc. Each "half DVD" is molded in the same kind of injection molding machine that has been used for many years in making CDs. Two discs are made in a conventional manner, with the major difference from the CD production process simply being that one of the reflective coatings has less metal (typically, gold) sputtered onto it so that it is only semireflective. The final DVD is produced simply by gluing what are basically two thin (higher capacity) CDs to each other. (The adhesive space layer serves to bond the two discs to each other, and also to provide a 55-micron separation that should be present for proper focusing.) The Mueller method is not necessary when making DVD-9 discs of the type shown in FIG. 2. It is not necessary when making any 0.6-mm disc that has only a single layer. It finds use when a 0.6-mm disc is to have dual layers.

The Dual layer, Single Side DVD-9 disc of FIG. 2, with one layer in each of the two substrates, is based on the design of Matsushita. But there is another way to make a DVD-9 disc, using the 2P process proposed by 3M. Instead of forming one layer in each substrate, the 2P process gives rise to a single 0.6-mm substrate structure with two internal information layers; in this case, the second substrate, necessary to give rise to a 1.2-mm thick finished product, is a total blank. The 2P process requires a stamping operation that can not take place in an enclosed mold, in addition to an injection molding operation, as will be described in detail below. Because CD manufacturing companies, the "natural" manufacturers for DVDs, have not used the required stamping equipment for making CDs, prior to the Mueller invention there was no known way to migrate easily to the making of dual-layer DVD discs without a major capital investment in equipment.

It should be appreciated that the real problem is not in making DVD-9 discs. The 3M-type 2P process that requires a stamping operation in "open" space is not necessary for making DVD-9 discs since conventional injection molding equipment by itself, using the Matsushita process, is sufficient for making DVD-9 discs (see FIG. 2). The real problem is in making 1.2 mm thick DVD-14 and DVD18 discs. A DVD-14 disc has two substrates, one a single layer and the other a dual layer. Because the single-layer substrate has a reflective layer that is read from its own side of the overall disc, the two information layers for the dual-layer disc that are read from the other side must both be in the same substrate. This means that a process similar to the 2P process must be used because the second layer for the DVD-9 side of the overall disc can no longer come from the other substrate—the second layer must be internal to the dual-layer substrate structure. Similarly, a DVD-18 disc (Dual Layer, Dual Side) requires two layers in each substrate, for a total of four. Thus, before the Mueller invention, there was no known way to avoid using some form of stamping process, along the lines of those proposed by 3M, for high capacity DVDs.

Figure 3:
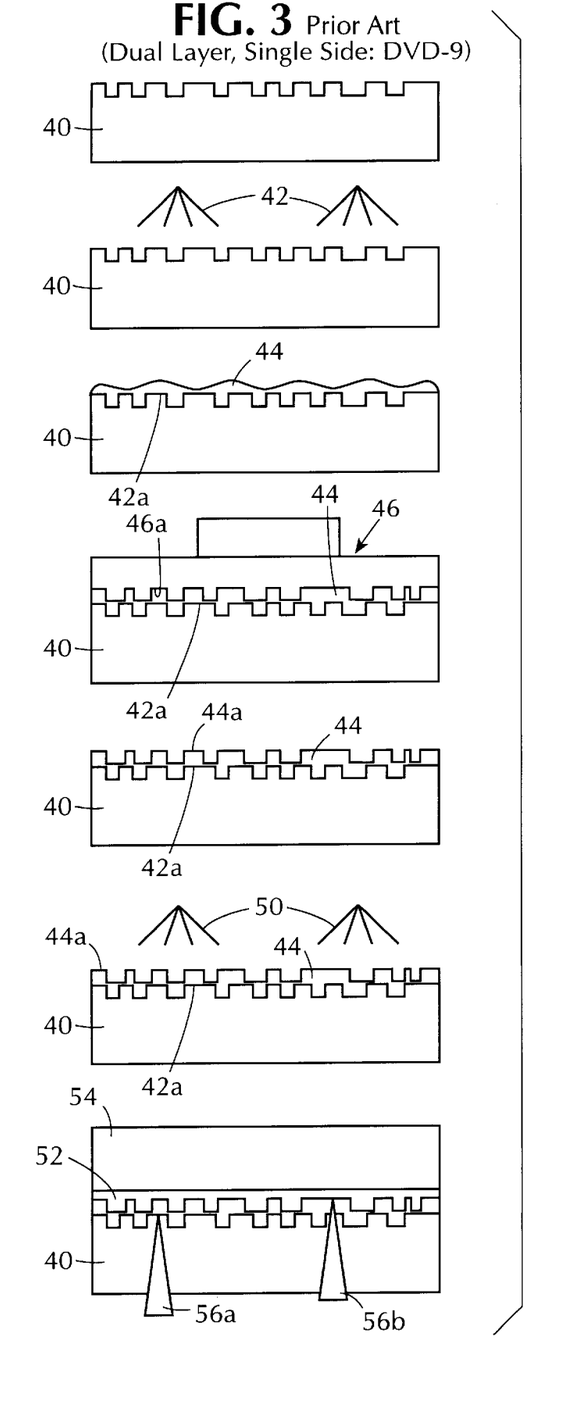
FIG. 3 depicts the standard steps used in the 2P process for making a prior art Dual-Layer, Single-Side DVD-9 disc.

To understand how the 3M process for making a dual-layer disc requires an open-space stamping operation, reference may be made to FIG. 3 which depicts the steps in making a simple Dual Layer, Single Side DVD-9 disc. The basic idea is to form one layer on a substrate, and to then add a second layer to the same substrate using a photopolymer (2P) material that is stamped.

In the first step, a substrate 40 with an information layer is injection molded in the usual way. Then gold is sputtered onto the information layer, as shown by the numeral 42, to form a semireflective layer 42a. This layer is covered with viscous, transparent, UV-resin material 44, and stamping equipment 46 (whose undersurface 46a in FIG. 3 has the pit-and-land pattern required of the second information layer) forms the inner-layer pattern in the surface 44a of the viscous material. While the stamper is in place, ultra-violet light is directed from the underside of the substrate, up through the semireflective layer 42a, to the resin in order to harden it. This stamping operation can not take place in an enclosed mold for the obvious reason that the mold itself would block the UV light from entering, and the resin would not harden in a reasonable time, if at all. (Also, injection molding equipment is operated at very high temperatures, and the 2P process must take place at room temperature.)

After the inner information layer has hardened, a conventional sputtering step, shown by the numeral 50, is employed to provide a fully reflective layer. Finally, a layer of glue 52 is placed on the fully reflective layer, and a blank 0.6-mm substrate 54 is glued on to form the second half of the finished disc. (Although reference is made herein to using "glue" to bond the two substrates to each other, in actual practice the two standard gluing techniques involve use of a hot melt or a UV resin. Also, after the bonding, a label can be printed in known manner.) The finished disc is "Single Side" because it is read from only one side, as shown by the diagrammatic laser beams 56a and 56b. It is "Dual Layer" because there are two information layers that are read from the single reading side.

Figure 4:
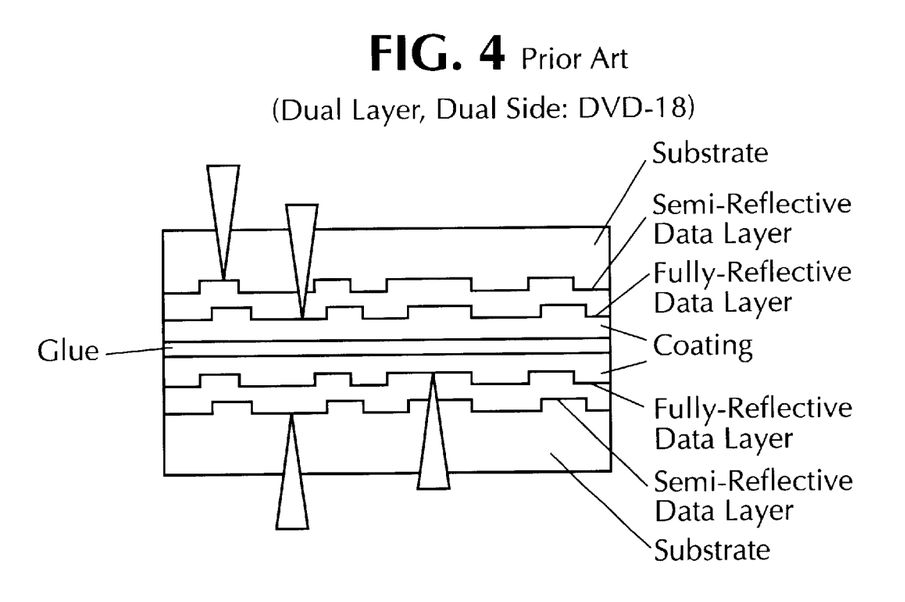
FIG. 4 depicts a prior art Dual-Layer, Dual-Side DVD-18 disc made by bonding together two Dual-Layer, Single-Side 0.6-mm discs.

A DVD-14 disc has two substrates, one a single layer (FIG. 1) and one a dual layer. As described above, the dual layer half is made today by the 2P process because the alternative dual-layer technique of FIG. 2 requires one layer in each of the two substrates, and were the second layer placed in the other substrate, then this substrate would have two layers and would have to be made using the 2P process. (A DVD-14 disc has a total of three information layers, so one of the two substrates must have two layers.) FIG. 4 shows a DVD-18 disc, where each substrate has two layers. It is apparent that each substrate must be made using the 2P or a comparable process that requires a stamping operation.

Figure 5:
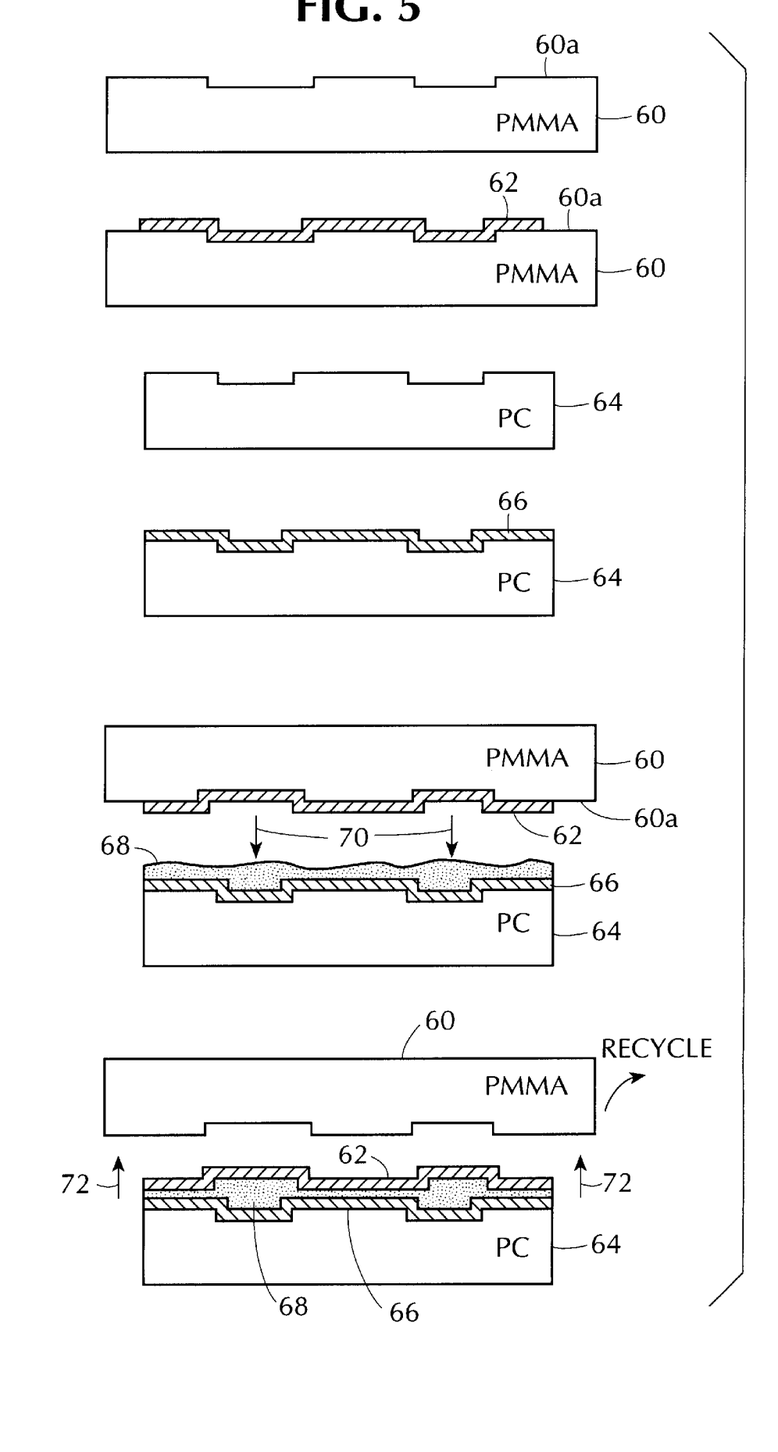
FIG. 5 depicts the steps for making a dual-layer 0.6-mm disc in accordance with the principles of the Mueller method.

The Mueller method, for making a dual-layer disc using injection molding equipment without requiring additional stamping equipment, is shown in FIG. 5. The basic idea is to make two substrates, each with a metallic information layer, in the usual way—with injection molding equipment. The metallic information layer on one of the substrates is then transferred to the other. In this way, a 0.6-mm dual-layer disc is formed without requiring additional stamping, and with both metallic layers having been sputtered onto molded substrates.

Conventional CD and DVD substrates are made of polycarbonate. Polymethyl methacrylate (PMMA) material offers several advantages over polycarbonate, one of them being that it is cheaper. While PMMA material has been used in the past to make laserdiscs, PMMA absorbs much more moisture than polycarbonate, and moisture can cause the various layers of a CD or DVD to release from each other. For this reason, PMMA is not typically used to make CDs and DVDs.

In the Mueller method, however, because it is actually desired that a metallic layer release from a substrate, as will become clear, the substrate which does not end up as part of the DVD can be made of PMMA. The fact that PMMA does not bond to aluminum, and adhesion is only through molecular roughness, aids in the transfer of the fully reflective coating from one substrate to the other.

The PMMA substrate 60 in FIG. 5 is molded in the usual way (see FIG. 1), and its surface 60a is the information layer from which layer 1 in a dual-layer DVD is to be replicated. The diameter of the disc may be larger than the 12-cm diameter of a CD or DVD, however, because the outer edge is used later as a release flange. A fully reflective aluminum data layer 62 is then sputtered onto the surface 60a. The diameter of the aluminum layer is 12 cm, equal to that of a DVD, because eventually the aluminum layer 62 will constitute layer 1 of the finished 0.6-mm substrate. Before sputtering, if desired, a release material such as silicone may be placed on surface 60a (or mixed in the plastic so that it migrates to the surface) to aid in the eventual separation of the layer 62 from the substrate.

The next two steps shown (the ordering of the steps is unimportant) represent the several steps required to make a conventional substrate with a semireflective layer (which will be layer 0 of the finished disc). The substrate 64 is made of the usual material, polycarbonate (PC), and its information surface is coated with a semireflective gold layer 66 (layer 0 of the finished disc).

The PMMA substrate is then positioned so that its data layer 62 faces data layer 66. Before the PMMA substrate is moved in the direction of arrows 70, a bonding layer 68 (shown much thicker than its true thickness of about 55 microns) is placed on data layer 66. When the two substrate structures are brought together, the metallic layer 62 transfers from substrate 60 to the bonding (adhesive) layer 68. The transfer is facilitated not only by the nature of the PMMA material, with whatever release material may also be employed, but also by the bonding material 68 which is designed to adhere to aluminum. A preferred bonding material is DIC No. 675, manufactured by the Dai Nippon Ink & Chemical Company.

In the last step, a force is applied in the direction of arrows 72 on the PMMA flange to separate it from the remaining structure. It will be recalled that the PMMA substrate 60 has a diameter larger than the diameter of a DVD precisely so that there will be an area against which a separating force can be applied. The metallic layer 62 remains with the polycarbonate substrate structure. The usual protective coating may then be applied (not shown) as the last step in the making of the 0.6-mm substrate. Finally, another single-layer or dual-layer substrate structure may be bonded (not shown) to the dual-layer structure to make a DVD-14 or DVD-18 disc.

FIG. 5 shows the PMMA substrate being recycled at the end of the manufacturing process. (The same thing is true if a polycarbonate substrate is used.) By recycling is meant that the substrate is melted down and used for some other purpose, perhaps even in the making of another data layer to be transferred, or even recoated directly with another aluminum data layer without first being melted down and another substrate molded for the purpose.)

Figure 6:
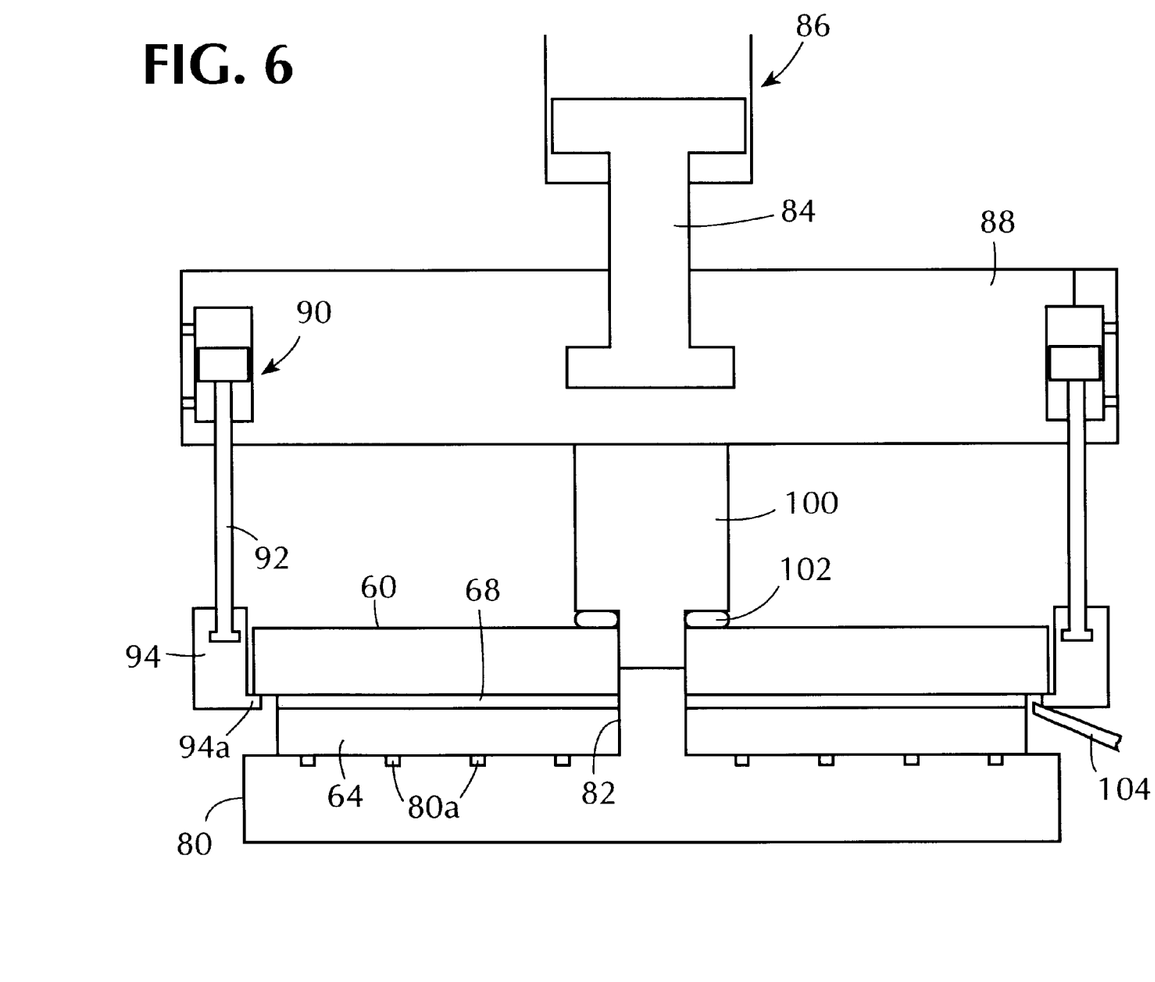
FIG. 6 is a diagrammatic sectional view of an apparatus for practicing the transfer and separation steps depicted in FIG. 5.

FIG. 6 depicts diagrammatically a machine proposed in the Mueller application for use during the manufacture of a dual-layer disc, after the- individual substrate structures have been formed and the fully reflective coating is to be transferred to the substrate structure that has the semireflective coating. Base 80 supports the substrate structure consisting of substrate 64 and semireflective coating 66. Ports 80a are coupled to a vacuum source to hold the substrate structure firmly in place until it is time for it to be released. A center post 82 properly positions the substrate structure.

Plate 88 is moved vertically by lift cylinder 86 and arm 84. Post 100 bears against a cushion 102 (an annular ring) which, in turn, rests on the substrate structure consisting of the PMMA substrate 60 and its fully reflective coating 62. Before the upper substrate structure is lowered, adhesive 68 is sprayed on top of the lower substrate structure by nozzle 104. The arm 84 is lowered to effect contact of the two substrate structures, and transfer of the fully reflective layer from the PMMA substrate to the polycarbonate substrate.

To separate the substrates from each other after the adhesive has hardened, the two trip cylinders 90 pull rods 92 upward so that fingers 94, whose engaging surfaces 94a bear against the undersurface of substrate 60, apply an upward force to the substrate. The post 100 and cushion 102 hold the center of the upper substrate in place while the edge is lifted slightly. Then the entire assembly is raised by lift cylinder 86 to effect the final separation of the substrates.

Figure 7:
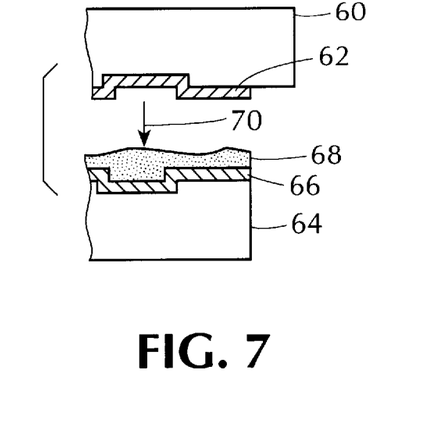
FIG. 7 shows the right end of the drawing depicting the next-to-last step in FIG. 5.

To appreciate the context of the present invention, FIG. 7 depicts the right end of the next-to-last step shown in FIG. 5, just prior to transfer of the fully reflective layer in the Mueller method. As soon as the two substrate structures make contact, fully reflective layer 62 bears against adhesive layer 68, and adhesive can be squeezed out along the edge of the sandwich. Some of the adhesive sticks to substrate 60 along the edge of the fully reflective layer 62, as shown by the numeral 68a in FIG. 8. (The layer 62 is shown in phantom because it is no longer present after the transfer, when substrate 60 is removed. What remains is adhesive 68', in a circular configuration, on substrate 60.) This adhesive prevents re-use of the substrate, for example, in sputtering and forming another fully reflective layer. And cleaning the surface of the substrate may damage its pit structure, making it unusable again in its present form. However, this is not the serious problem because the PMMA substrate is often simply discarded after a single use.

Figure 8:
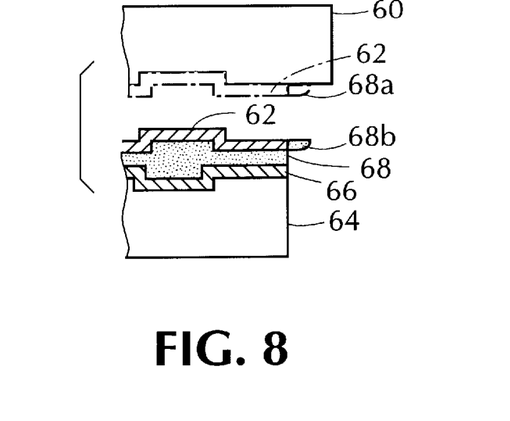
FIG. 8 shows where in the drawing of FIG. 7 it is likely to find adhering adhesive when using the Mueller method.

The serious problem is that shown in the bottom half of FIG. 8. Some of the adhesive, shown by the numeral 68b, adheres around the edge of the fully reflective layer 62 (after it has been transferred). It is very difficult to remove this adhesive without contaminating the substrate and causing problems in the subsequent bonding step.

Figure 9:
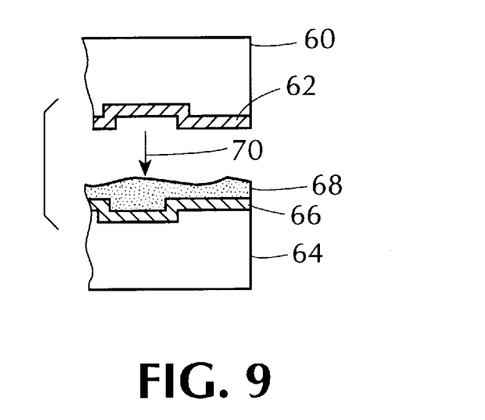
FIG. 9 is a drawing comparable to that of FIG. 7 but shows how in my invention substrates of equal diameter are used.
Figure 10:
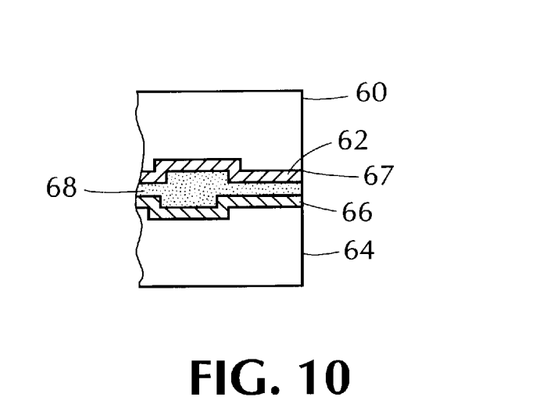
FIG. 10 depicts the substrate "sandwich" while the fully reflective layer is being transferred.

In accordance with my invention, both substrates have the same diameter. Thus FIG. 9 is the same as FIG. 7 except for this difference. FIG. 10 shows the substrate "sandwich" after the two substrates structures are brought together to accomplish the transfer of the fully reflective layer. Any adhesive that transfers to substrate 60 is along the outer edge, not even in the plane of the pit-and-land structure. By milling the outer edge of the sandwich before the substrates are separated, the transferred adhesive can be stripped off. And this can be accomplished without possibly damaging layer 62 because it is completely internal to the "sandwich."

Figure 11:
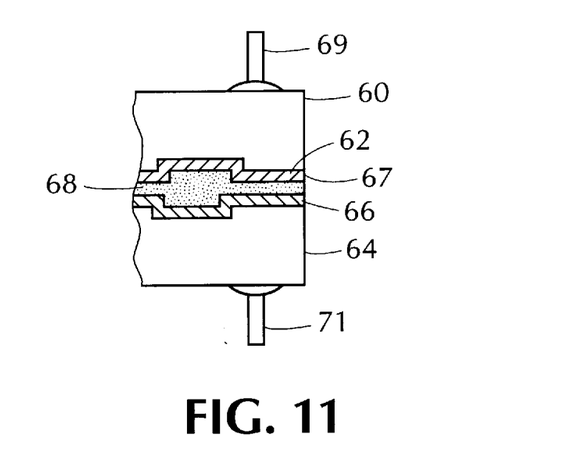
FIG. 11 shows how the carrier substrate for the fully reflective layer can be separated from the substrate structure for the DVD even though there is no peripheral surface to which a force can be applied.

An added advantage of this technique is that the vibration from the milling actually separates the fully reflective layer 62 slightly from substrate 60, in the vicinity of the edge, shown by the numeral 67. This makes it easier to separate the substrate structures. In the Mueller method, the substrate 60 is separated by forcing up on the substrate periphery (see bottom of FIG. 5). There is no periphery in the method of my invention. However, the use of standard suction cups 69, 71 in FIG. 11 allows the substrates to be pulled apart from each other.

Figure 12:
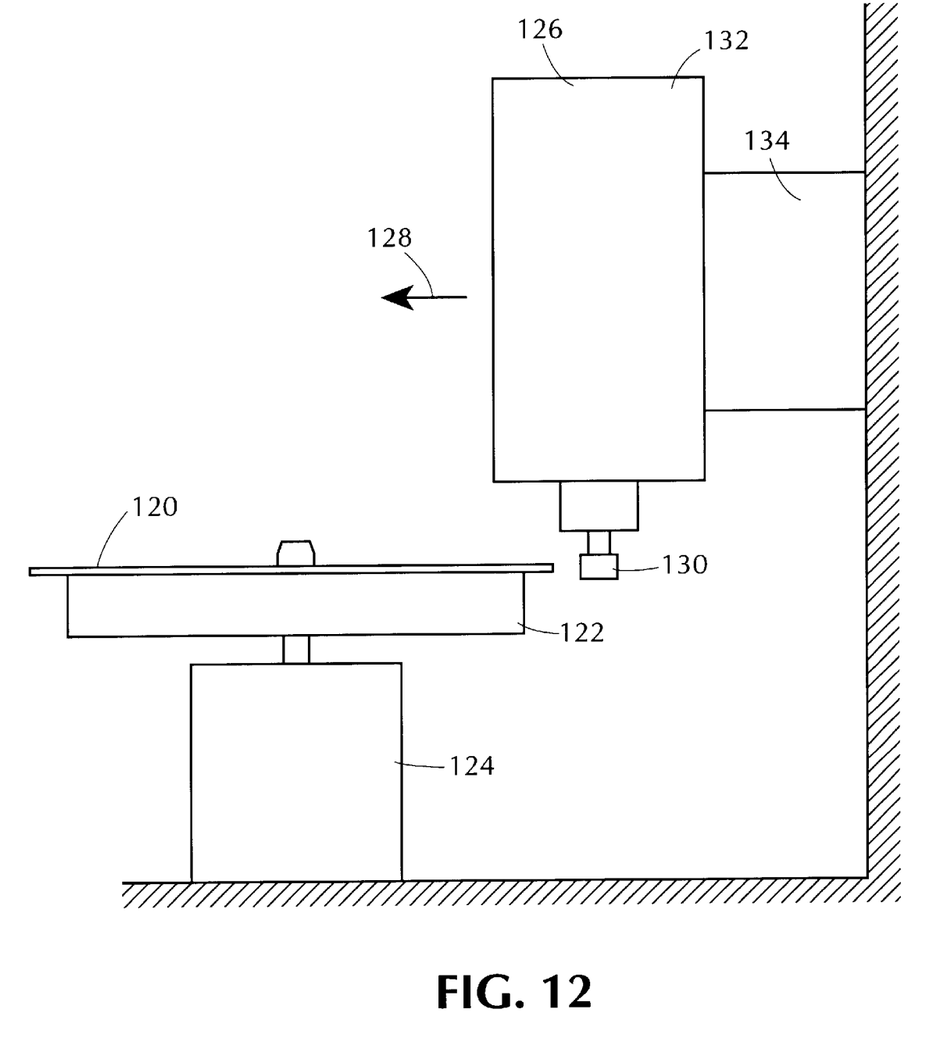
FIG. 12 depicts milling apparatus suitable for use in my invention.

FIG. 12 depicts equipment that can be used in the edge-milling operation to remove any adhesive that adheres to the edge of the substrate "sandwich" 120. The combined substrate structures are centered on chuck 122 and held down by vacuum ports (similar to vacuum ports 80a of FIG. 6). The substrate structures are slowly rotated by motor 124. Rotary milling bit 130 is driven by high-speed motor 126. The motor and bit assembly is moved by air cylinder 134 in the direction of arrow 128 in order to effect the edge milling, at least one full revolution of the substrate structures being necessary to ensure that all adhesive around the edge is removed.

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

What I claim is:

1. A method of making a dual-layer disc suitable for use as one of the two substrate structures of a DVD-14 or DVD-18 disc comprising the steps of:

(a) molding a first substrate to have a data layer and coating said data layer with a semireflective coating to form a first substrate structure, (b) molding a second substrate having the same diameter as said first substrate to have a data layer and coating said data layer with a fully reflective coating to form a second substrate structure, (c) placing an adhesive on the semireflective coating of said first substrate structure, (d) placing said first and second substrate structures in contact with each other with said fully reflective coating on said second substrate structure bearing against the adhesive on said first substrate structure so that said fully reflective coating transfers from said second substrate structure to said first substrate structure, and (e) separating said second substrate structure from said first substrate structure following transfer of said fully reflective coating.

2. A method of making a dual-layer disc in accordance with claim 1 further including the step of milling the edges of said first and second substrates while said first and second substrate structures are in contact with each other in step (d).

3. A method of making a dual-layer disc in accordance with claim 2 wherein said first substrate is molded of polycarbonate and said second substrate is molded of PMMA.

4. A method of making a dual-layer disc in accordance with claim 1 wherein said first substrate is molded of polycarbonate and said second substrate is molded of PMMA.

5. A method of making a dual-layer disc comprising the steps of:

(a) molding a first substrate to have a data layer and coating said data layer with a semireflective coating to form a first substrate structure, (b) molding a second substrate having the same diameter as said first substrate to have a data layer and coating said data layer with a fully reflective coating to form a second substrate structure, (c) placing said first and second substrate structures in contact with each other with an adhesive material therebetween and with said fully reflective coating on said second substrate structure facing said semireflective coating on said first substrate structure so that said fully reflective coating transfers from said second substrate structure to said first substrate structure, and (d) separating said second substrate structure from said first substrate structure following transfer of said fully reflective coating.

6. A method of making a dual-layer disc in accordance with claim 5 further including the step of milling the edges of said first and second substrates while said first and second substrate structures are in contact with each other in step (c).

7. A method of making a dual-layer disc in accordance with claim 6 wherein said first substrate is molded of polycarbonate and said second substrate is molded of PMMA.

8. A method of making a dual-layer disc in accordance with claim 5 wherein said first substrate is molded of polycarbonate and said second substrate is molded of PMMA.

* * * * *